United States Patent
Hayes

[11] Patent Number: 5,805,362
[45] Date of Patent: Sep. 8, 1998

[54] FOCUSING MECHANISM USING A THIN DIAPHRAGM

[75] Inventor: James Nelson Hayes, Urbana, Ohio

[73] Assignee: Spectra Precision, Inc., Dayton, Ohio

[21] Appl. No.: 834,477

[22] Filed: Apr. 11, 1997

[51] Int. Cl.[6] .................................................. G02B 7/02
[52] U.S. Cl. ............................................ 359/819; 359/822
[58] Field of Search .................................. 359/819, 811, 359/739, 740, 822, 694; 356/248, 250

[56] References Cited

U.S. PATENT DOCUMENTS

| | | | |
|---|---|---|---|
| 3,936,197 | 2/1976 | Aldrink et al. | 366/250 |
| 4,062,634 | 12/1977 | Rando et al. | 356/248 |
| 4,221,483 | 9/1980 | Rando | 356/250 |
| 4,662,707 | 5/1987 | Teach et al. | 359/198 |
| 4,895,440 | 1/1990 | Cain et al. | 356/5 |
| 5,077,569 | 12/1991 | Notagashira et al. | 354/195.12 |
| 5,144,486 | 9/1992 | Hart | 359/629 |
| 5,257,279 | 10/1993 | Dugan et al. | 372/101 |
| 5,375,663 | 12/1994 | Teach | 172/4.5 |
| 5,513,001 | 4/1996 | Ohtomo et al. | 356/249 |
| 5,517,023 | 5/1996 | Ohtomo et al. | 250/234 |
| 5,636,064 | 6/1997 | Nomura et al. | 359/704 |
| 5,654,837 | 8/1997 | Tanaka | 359/825 |
| 5,663,839 | 9/1997 | Kanno | 359/700 |

FOREIGN PATENT DOCUMENTS

| | | |
|---|---|---|
| 0643283A1 | 3/1995 | European Pat. Off. . |
| 6201383 | 7/1994 | Japan . |

*Primary Examiner*—Georgia Y. Epps
*Assistant Examiner*—Ricky Mack
*Attorney, Agent, or Firm*—Killworth, Gottman, Hagan & Schaeff, L.L.P.

[57] ABSTRACT

A device for focusing light from a laser transmitter is provided. A focusing lens is coupled to a inner portion of a disc shaped diaphragm and the outer portion of the diaphragm is coupled to a mounting assembly. The diaphragm is flexible along the optical axis of the focusing lens but rigid along the transverse plane of the lens. The focus point of a laser is changed by flexing the diaphragm in a direction parallel to the optical axis with a diaphragm flexing device. The position of the lens along the optical axis changes as the diaphragm is flexed, thereby changing the focus point of the laser. The lens does not move laterally so that there is no tilting of the laser beam off the optical axis.

33 Claims, 3 Drawing Sheets

FOCUSING MECHANISM USING A THIN DIAPHRAGM

This application is related to commonly assigned U.S. patent application Ser. Nos.: 08/834,472, POSITION LEVELING SENSOR FOR A LASER TRANSMITTER, filed Apr. 11, 1997, by Jackson et al.; Ser. No. 08/834,473, AUTOFOCUSING SYSTEM FOR A LASER TRANSMITTER, filed Apr. 11, 1997, by Green et al.; Ser. No. 08/834,476, LASER TRANSMITTER INCORPORATING TARGET DITHER, filed Apr. 11, 1997, by Green et al.; and Ser. No. 08/833,978, SYSTEM FOR ADJUSTING THE ORIENTATION OF A PLANE OF LASER LIGHT, filed Apr. 11, 1997, by Detweiler et al., the disclosures of which are incorporated herein by reference.

BACKGROUND OF THE INVENTION

The present invention generally relates to the focusing of laser light emitted by laser instruments and, in particular, to the use of a focusing lens to improve the focus of a plane of reflected laser light in a laser transmitter.

Laser light systems have been employed in numerous surveying and construction applications. In one such system, a laser light transmitting device provides a rotating laser beam which establishes a reference plane. Typically, the rotating laser beam is used to provide a plane of light that creates a constant horizontal bench mark of elevation over an entire work area. The laser light is either detected by the naked eye or by one or more laser beam detectors, placed at considerable distances from the transmitting device. The user performs various construction tasks based on the visual perception of the laser light, while the detectors are used to intercept the rotating laser beam and determine the proper elevation at selected points throughout the work area.

In the laser light transmitting device, the generally horizontal plane of light is produced by projecting the beam generally upward or downward and then deflecting the beam ninety degrees within a pentaprism or penta-mirror assembly. The pentaprism assembly is rotated about a vertical axis within the transmitting device to cause the horizontal beam to rotate and define the horizontal plane.

A focused beam of light increases the accuracy of the detectors and makes the laser light readily visible to the naked eye. The required focus is dependent on the distance between the laser light transmitting device and the desired focusing location. Laser diodes are typically used as light sources in laser light transmitting devices. The laser diode is positioned at the design back focus distance of a collimating lens so that a beam of collimated light is produced. A focusing lens may be used to focus the light emitted by the laser diode. However, it is also important that the beam of light be oriented along the optical axis of the collimating lens. The focusing lens must be oriented along the optical axis of the collimating lens to prevent tilting of the laser beam. Tilting the laser beam will produce a variation in the angular orientation of the laser beam. The resultant variation in the angular orientation will produce a grade error in the output of the laser transmitter.

Prior art focusing devices have used focusing lens to adjust the focus of laser beams. However, the prior art devices have either failed to address or have used complex mechanisms to control lateral movement of the focusing.

A prior art focusing device in a optical disc system uses a lens coupled to a voice coil. The voice coil and lens are used to compensate for planar irregularities associated with the optical disc so that a focused beam of light is projected on the disc. Electrical signals are used to vibrate the voice coil and change the focus of the beam. However, the voice coil does not prevent lateral movement of the lens which leads to alignment errors. Further, a voice coil may not be used in applications which require a constant focus since a voice coil vibrates.

Accordingly, there is a need for a focusing mechanism in a laser transmitter which can be shifted along the optical axis to facilitate focusing of the laser beam, but will not shift in a lateral direction. There is also need for a focusing lens that can be shifted with the application of an axial force.

SUMMARY OF THE INVENTION

The present invention meets the aforementioned needs by providing a focusing mechanism in a laser transmitter which can be shifted along the optical axis to facilitate focusing of the laser beam, but will not shift in the lateral direction.

According to a first aspect of the present invention, the focusing mechanism includes a lens element having an outer diameter, an optical axis and a transverse plane, at least a first diaphragm having a first opening in which the lens element is mounted, a mounting assembly coupled to the first diaphragm, and a diaphragm flexing assembly coupled to the mounting assembly. The first diaphragm is relatively flexible in a direction parallel to the optical axis of the lens element and relatively rigid in a direction parallel to the transverse plane of the lens element. The diaphragm is flexed by the diaphragm flexing assembly so as to position the lens element in the direction parallel to the optical axis. The first diaphragm is preferably substantially disc shaped having a center point through which the optical axis of the lens passes. The first diaphragm may be substantially flat with a solid cross-section. Preferably, the first diaphragm has a first corrugated cross-section. The focusing mechanism may comprise a plurality of first diaphragms.

According to another aspect of the present invention, the focusing mechanism may include a second diaphragm having a second opening and a second corrugated cross-section. The lens element is mounted in the openings of the first and second diaphragms. The second diaphragm is relatively flexible in the direction parallel to the optical axis of the lens and relatively rigid in the direction parallel to the transverse plane. Preferably, the first corrugated cross-section corresponds to the second corrugated cross-section.

According to yet another aspect of the present invention, the lens element includes a lens and a lens housing having a third opening, a first clamp and a second clamp. The lens is mounted in the third opening of the lens housing by the first clamp. The first diaphragm has a first clamping section substantially adjacent to the second opening of the first diaphragm with the first clamping section of the first diaphragm being coupled to the lens housing by the second clamp.

According to yet another aspect of the present invention, the mounting assembly includes a mounting member having a fourth opening and a third clamp. The first diaphragm has an outer edge and a second clamping section substantially adjacent to the outer edge with the second clamping section of the first diaphragm being mounted in the fourth opening of the mounting member by the third clamp.

According to another aspect of the present invention, the diaphragm flexing assembly includes a focusing arm having a first end, a second end, and a hook, a leadscrew having external threads, and a leadscrew nut having a body coupled to the first end of the focusing arm and internal threads corresponding to and engaging the external threads of the leadscrew. The leadscrew nut moves in a first direction parallel to the optical axis and the focusing arm pivots angularly about the second end of the focusing arm as the leadscrew is rotated in a first circular direction. Conversely, the leadscrew nut moves in a second direction parallel to the optical axis and opposite the first direction and the focusing arm pivots angularly about the second end of the focusing arm as the leadscrew is rotated in a second circular direction opposite the first circular direction. The lens housing includes a pin coupled to the hook of the focusing arm, so that as the focusing arm pivots angularly about the second end of the focusing arm as the leadscrew moves in the first or second directions, the hook engages the pin causing the first diaphragm to flex in the first or second directions causing the lens to correspondingly move in the first or second directions parallel to optical axis. Preferably, the mounting member may include a flexible pivot strip coupled to the second end of the focusing arm. The diaphragm flexing device may include a motor having a shaft coupled to the leadscrew. The motor rotates the shaft in the first or second circular directions, thereby rotating the leadscrew. The diaphragm flexing device may include a cable coupled to the leadscrew. The leadscrew is rotated in the first or second circular directions by turning the cable in the first or second circular directions.

According to yet another aspect of the current invention, the diaphragm flexing assembly may include a focus stop screw substantially adjacent the first end of the focusing arm. The focusing arm engages the focus stop screw after the leadscrew nut travels a predetermined distance in the second direction parallel to the optical axis. Preferably, the diaphragm flexing assembly may include at least one spring coupled to the focusing arm and the mounting assembly so that the focusing arm is positioned on the leadscrew nut as the leadscrew nut travels in the first and second directions.

According to another embodiment of the present invention a laser transmitting device for transmitting laser light along a plane includes a housing, a light source coupled to the housing for generating the laser light, a focusing mechanism coupled to the housing and positioned to focus the laser light, and an optical projecting device coupled to the housing and positioned to receive said laser light from the focusing mechanism. The optical projecting device includes a rotating reflector to project the laser light along the plane. The focusing mechanism may include all of the aspects described above.

Other objects and advantages of the invention will be apparent from the following description, the accompanying drawings and the appended claims.

DESCRIPTION OF THE INVENTION

Figure 1:
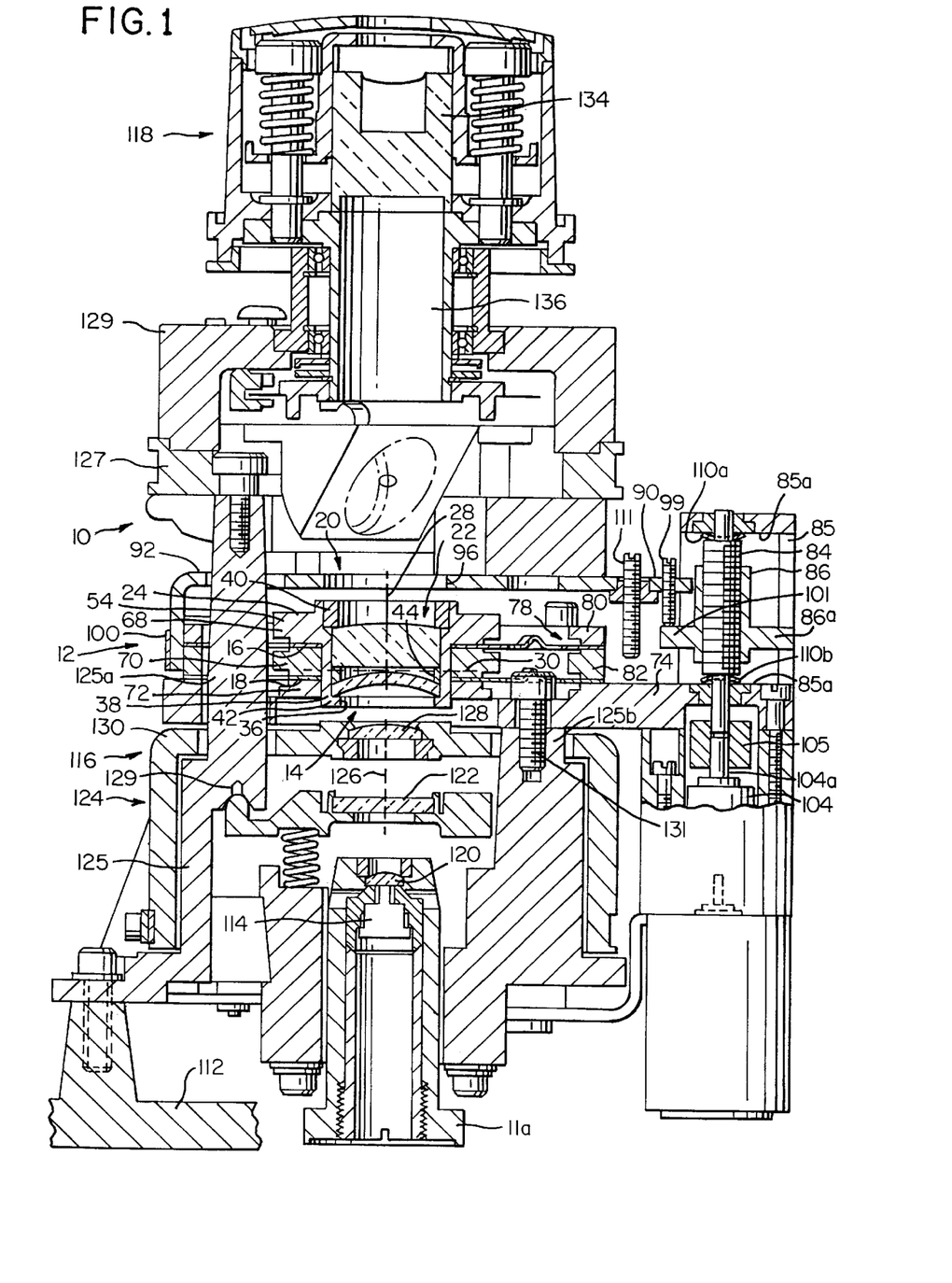
FIG. 1 is a cross-sectional view of a laser transmitter in accordance with the present invention.
Figures 2, 3, 4:
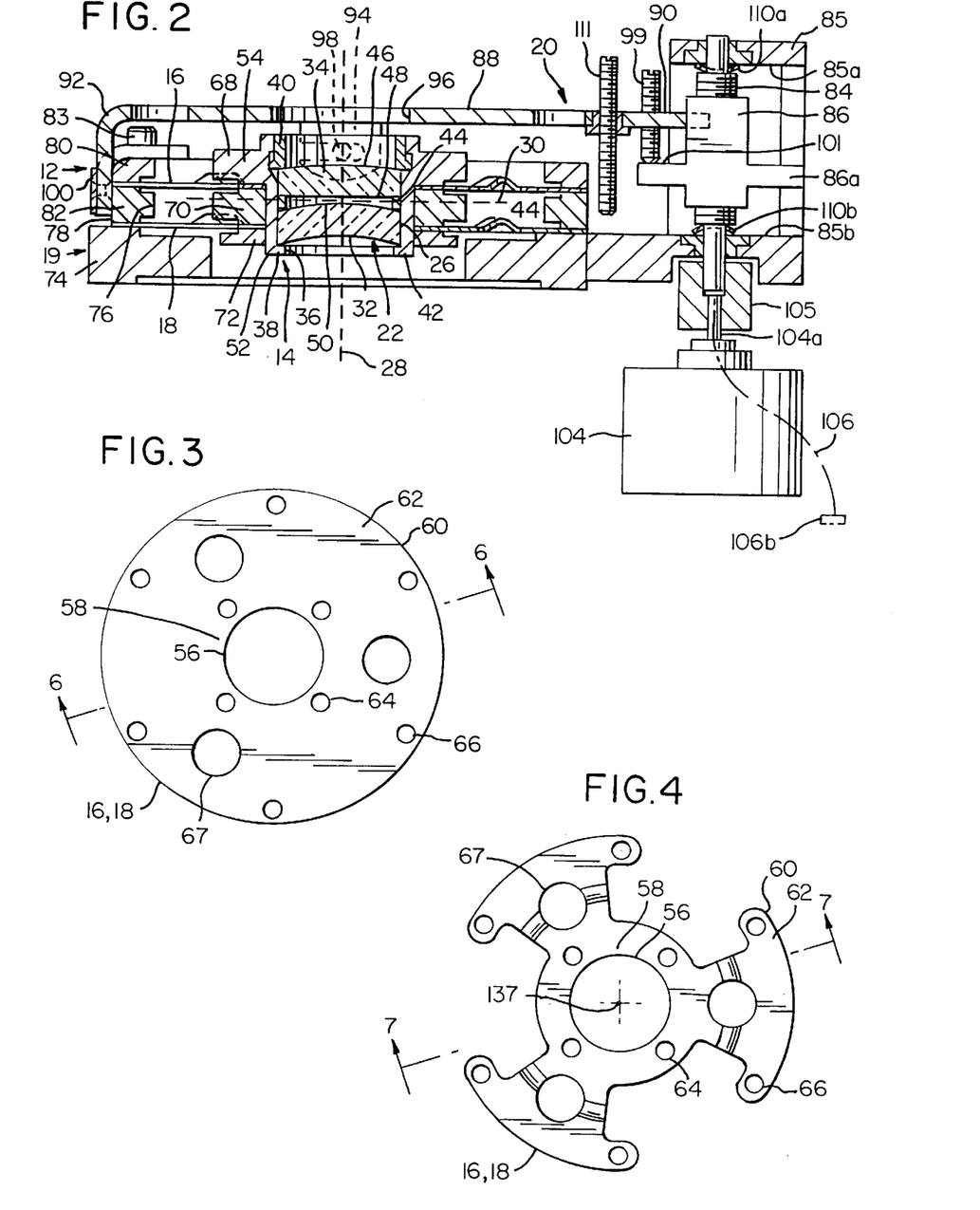
FIG. 2 is cross-sectional view of a focusing mechanism of the laser transmitter of FIG. 1.
FIG. 3 is a top view of a flat, solid diaphragm of the focusing mechanism of FIG. 2.
FIG. 4 is a top view of a corrugated diaphragm of the focusing mechanism of FIG. 2.

Referring now to FIGS. 1 and 2, a laser light transmitter 10 provided with a focusing mechanism 12 according to the present invention is shown. As shown in FIG. 2, the focusing mechanism 12 comprises a lens element 14, a first diaphragm 16, a second diaphragm 18, a mounting assembly 19, and a diaphragm flexing assembly 20. The lens element 14 includes a lens 22 and a lens housing 24.

The lens 22 has an outer diameter 26, an optical axis 28 and a transverse plane 30 extending perpendicularly out of the plane of the paper. The lens 22 may consist of a simple lens or a compound lens which is thick, thin, planar, concave, convex or any combination of the same. According to the illustrated embodiment, the lens 22 comprises a compound lens triplet which includes a convex meniscus lens 32 and a compound doublet lens 34. The compound doublet lens 34 consists of a biconvex lens (not shown) cemented to a convex meniscus lens (not shown). The lenses used to form compound doublet lens 34 preferably have different indices of refraction.

The lens 22 is mounted to the first and second diaphragms 16, 18 via the lens housing 24. The lens housing 24 has an opening 36 defined by a first cylindrical clamp 38. The first cylindrical clamp 38 includes a first annular stop 40, a second annular stop 42 and an annular separator 44. The lens 22 is securely mounted in opening 36 by the first cylindrical clamp 38 with the first annular stop 40 engaging a top outer edge 46 of the compound doublet lens 34, the annular separator 44 engaging a bottom outer edge 48 of the compound doublet lens 34 and a top outer edge 50 of the convex meniscus lens 32, and the second annular stop 42 engaging a bottom outer edge 52 of the convex meniscus lens 32. Preferably, the first annular stop 40 is mounted to the first cylindrical clamp 38 using conventional fastener means (not shown). It will be appreciated by those skilled in the art that the lens 22 may be coupled directly to the diaphragms 16, 18 without the need of the lens housing 24. The lens housing 24 includes a second cylindrical clamp 54 which engages an inner portion of the first and second diaphragms 16, 18.

Preferably, the first and second diaphragms 16, 18 are identical in size and shape so that a discussion of one diaphragm is synonymous with a discussion of the other diaphragm. As shown in FIGS. 3 and 4, the diaphragm 16, 18 is substantially disc shaped having an opening 56, a first clamping section 58 substantially adjacent to the opening 56, an outer edge 60, and a second clamping section 62 substantially adjacent to the outer edge 60. The first clamping section 58 includes inner mounting holes 64 while the second clamping section 62 includes outer mounting holes 66. The diaphragms 16, 18 also include openings 67 to allow passage of other mounting elements to be discussed further herein. As shown in FIGS. 1 and 2, the first clamping section 58 of the first and second diaphragms 16, 18 are coupled to the lens housing 24 via the second cylindrical clamp 54. The second cylindrical clamp 54 includes a first annular member 68, a annular separator 70 and a second annular member 72. The first annular member 68, the annular separator 70 and the second annular member 72 include openings (not shown) which are aligned with the mounting holes 64 of the first clamping section 58. The first clamping section 58 of the first diaphragm 16 is positioned between the first annular member 68 and the annular separator 70 while the first clamping section 58 of the second diaphragm 18 is positioned between the annular separator 70 and the second annular member 72. Conventional fastener means (not shown) are passed through the openings (not shown) and the mounting holes 64 to securely mount the inner portion of the first and second diaphragms 16, 18 to the lens housing 24. Preferably, the first and second diaphragms 16, 18 are formed from a beryllium copper alloy.

The outer portion of the first and second diaphragms 16, 18 are coupled to the mounting assembly 19. The mounting assembly 19 includes an annular mounting member 74 defining an opening 76 and a clamp 78. The clamp 78 includes an annular member 80 and an annular separator 82. The annular mounting member 74, the annular member 80 and the annular separator 82 include openings (not shown) which are aligned with the mounting holes 66 of the second clamping section 62. The second clamping section 62 of the first diaphragm 16 is positioned in opening 76 between the annular member 80 and the annular separator 82 while the second clamping section 62 of the second diaphragm 18 is positioned between the annular separator 82 and the annular mounting member 74. Conventional fasteners 83 are passed through the openings (not shown) and the mounting holes 66 to securely mount the outer portion of the first and second diaphragms 16, 18 to the mounting assembly 19. The first and second diaphragms 16, 18 are relatively flexible in a direction parallel to the optical axis 28 but relatively rigid in a direction parallel to the transverse plane 30.

Figure 5:
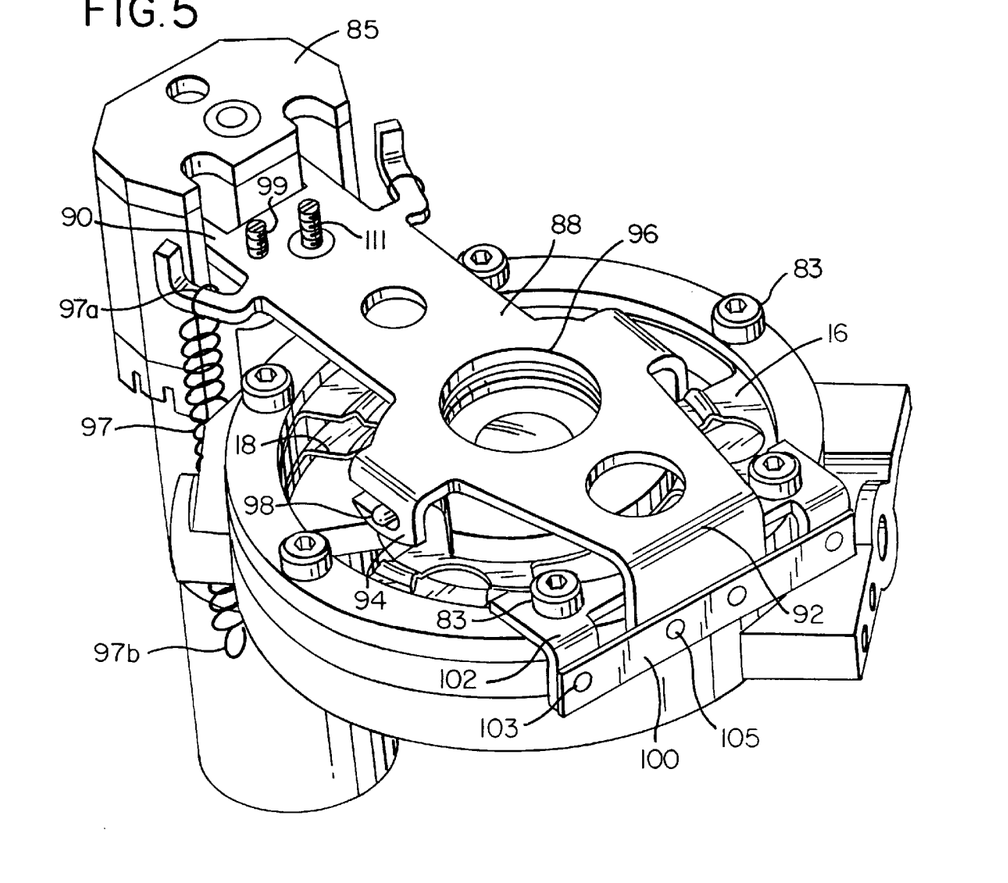
FIG. 5 is perspective view of the focusing mechanism.

The mounting assembly 19 is coupled to the diaphragm flexing assembly 20 for flexing the first and second diaphragms 16, 18, thereby changing the position of the lens 22. As shown in FIGS. 1, 3 and 5, the diaphragm flexing assembly 20 includes a leadscrew 84, a leadscrew housing 85, a leadscrew nut 86 and a focusing arm 88 having a first end 90, a second end 92, hooks 94, an opening 96 and springs 97. The lens housing 24 includes a pivot pin 98 which engages the hooks 94. The first end 90 of the focusing arm 88 includes a set screw 99 which is positioned on a top portion 101 of the leadscrew nut 86. The leadscrew nut 86 includes internal threads (not shown) which correspond to and engage external threads (not shown) on the leadscrew 84. The leadscrew nut 86 translates linearly between an upper portion 85a and lower portion 85b of the leadscrew housing 85 as the leadscrew 84 is rotated.

The second end 92 of the focusing arm 88 is coupled to a flexible pivot strip 100 on the mounting assembly 19. As shown in FIG. 5, the mounting assembly 19 includes a bracket 102 secured to the annular mounting member 74 through conventional fasteners 83. The flexible pivot strip 100 is secured to opposite ends of the bracket 102 using conventional fastener means 103. The second end 92 of the focusing arm 88 is secured to the center of the flexible pivot strip 100 using conventional fastener means 105 creating a flexural pivot. The opening 96 is positioned over the lens 22.

The leadscrew nut 86 is positioned between the upper portion 85a and the lower portion 85b so that with the set screw 99 of the focusing arm 88 positioned on the top portion 101 of the leadscrew nut 86, the diaphragms 16, 18 are in a nominal state.

The set screw 99 may be raised or lowered to adjust the position of the focusing arm 88 with respect to the leadscrew nut 86, and thus the nominal state of the diaphragms 16, 18. The leadscrew nut 86 includes a first outwardly extending arm 86a which is positioned in a slot (not shown) of leadscrew housing 85. This arrangement keeps the leadscrew nut 86 from rotating as the leadscrew 84 is rotated.

The springs 97 are mounted on both sides of the first end 90 of the focusing arm 88. A top portion 97a of the springs 97 is mounted to the focusing arm 88 while a bottom portion 97b is mounted to a stationary object. The stationary object may be the mounting assembly 19 or the housing of the laser transmitter 10.

The springs 97 compensate for the spring force of the diaphragms 16, 18 so that a constant downward force is applied to the focusing arm 88. The constant downward force keeps the focusing arm 88 in contact with the leadscrew nut 86 for all degrees of flexion of the diaphragms 16, 18. It should be apparent to those skilled in the art that a single spring may be used without departing from the scope of the invention. It should be further apparent to those skilled in the art that other flexible devices, such as a rubber band, may be used in place of the spring without departing from the scope of the invention.

The leadscrew nut 86 moves in a first direction parallel to the optical axis 28 as the leadscrew 84 is rotated in a first circular direction. The leadscrew nut 86 engages the set screw 99 causing the focusing arm 88 to pivot angularly about the second end 92. The flexible pivot strip 100 twists as the focusing arm 88 moves, providing linear and repeatable movement of the focusing arm 88 at the second end 92. As the focusing arm 88 pivots angularly about the second end 92, the hooks 94 engage the pivot pin 98 causing the first and second diaphragms 16, 18 to flex in the first direction away from the nominal position, thereby moving the lens housing 24 and the lens 22 in the first direction. Preferably, the flexible pivot strip 100 is formed of a beryllium copper alloy. It should be appreciated by those skilled in the art that other means, such as a hinge, may be used to provide a flexural pivot between the focusing arm 88 and the mounting assembly 19.

Conversely, the leadscrew nut 86 moves in a second direction parallel to the optical axis 28 and opposite the first direction as the leadscrew 86 is rotated in a second circular direction opposite the first circular direction. The springs 97 keep the focusing arm 88 on the leadscrew nut 86 as the diaphragms 16, 18 flex from the nominal position to a flexed position in the second direction. The focusing arm 88 again pivots angularly about the second end 92. The hooks 94 engage the pivot pin 98 causing the first and second diaphragms 16, 18 to flex in the second direction, thereby moving the lens housing 24 and the lens 22 in the second direction. Consequently, as the leadscrew 84 is rotated in the first or second directions, the position of the lens 22 changes, thereby adjusting the focus of radiation passing through the lens 22.

Figure 6:
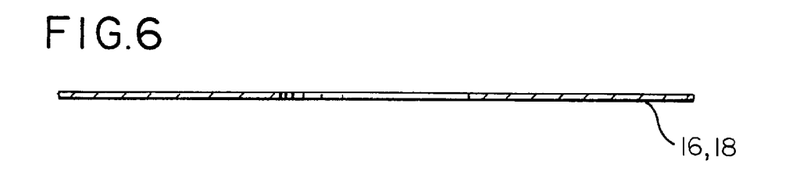
FIG. 6 is a cross-sectional view of the flat, solid diaphragm taken along view line 6—6 in FIG. 3.

The range of movement of the diaphragm is dependent on the shape and configuration of the diaphragm. As shown in FIGS. 3 and 6, the diaphragm 16, 18 may be substantially flat with a solid cross-section. While such a diaphragm 16, 18 is relatively flexible in an axial direction and relatively rigid in a transverse direction, the range of motion is very limited. The spring constant of such a diaphragm is very nonlinear with one value within a deflection of a few material thicknesses of the unflexed state and significantly greater values as the deflection increases. While the lens 22 may not appreciably tilt in the transverse direction, adjusting the position of the lens 22 in an axial direction by flexing the diaphragm will be unstable for large deflections and will require the application of nonlinear axial forces.

Figure 7:
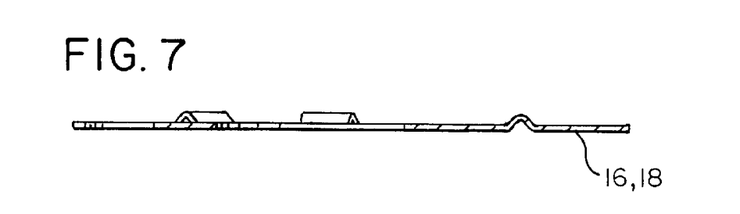
FIG. 7 is a cross-sectional view of the corrugated diaphragm taken along view line 7—7 in FIG. 4.

In a preferred embodiment of the present invention, the diaphragm 16, 18 is corrugated as shown in FIGS. 4 and 7. Such a corrugated diaphragm 16, 18 has a substantially linear spring constant. The diaphragm 16, 18 may be flexed with the application of a linear axial force allowing for stable deflections over a larger range. It will be appreciated by those skilled in the art that other corrugated diaphragms may be used. The size, location, number of corrugations, and number of cutouts and holes in the diaphragm may vary as long as the equivalent spring rate is constant around the diaphragm. While the illustrated embodiment of the invention includes two diaphragms 16, 18, it should be apparent that one or a plurality of diaphragms may be used without departing from the scope of the present invention. The lens 22 and the lens housing 24 are susceptible to slight tilting as a result of the loading required for axial translation. A second diaphragm having the same configuration and aligned with a first diaphragm will afford greater stiffness in the axial direction while providing a more constant spring rate. The amount of tilting is nearly eliminated as a result of the second diaphragm. Similarly, additional diaphragms may be added if the axial load is increased, thereby providing more stability in the axial direction. Further, the optical axis 28 of the lens 22 should pass through an equivalent center point 137 of the diaphragm 16, 18 to prevent the lens 22 from translating if there is any tilting of the lens 22.

Referring to FIG. 2, the leadscrew 84 may be rotated automatically using a motor 104 or manually using a flexible cable 106. The motor 104 includes a drive shaft 104a which is coupled to the leadscrew 84 via a coupler 105. Rotation of the drive shaft 104a by the motor 104 effectuates rotation of the leadscrew 84. The power to the motor 104 may be controlled by appropriate control circuitry, either manually with an appropriate control switch or automatically with focusing sensors as disclosed in copending application, U.S. patent application Ser. No. 08/834,473, AUTOFOCUSING SYSTEM FOR A LASER TRANSMITTER, filed Apr. 11, 1997, by Green et al., herein incorporated by reference. Similarly, the flexible cable 106 is coupled to the leadscrew 86 via the coupler 105. The flexible cable 106 includes a knob 106b, the rotation of which effectuates rotation of the leadscrew 84. The maximum amount of deflection of the first and second diaphragms 16, 18 in the first direction is controlled by the distance between the leadscrew nut 86 with the diaphragms 16, 18 in the nominal state and a first curved spring washer 110a. The first curved spring washer 110a is positioned around the leadscrew 84 substantially adjacent to the upper portion 85a of the leadscrew housing 85. The motor 104 or the cable 106 rotates the leadscrew until the leadscrew nut 86 engages the curved spring washer 110a. Once the leadscrew nut 86 engages the curved spring washer 110a, the motor 104 is shut-off or sufficient resistance is provided to prevent further rotation of the leadscrew 84 by the cable 106. The maximum deflection of the diaphragms 16, 18 in the first direction, in conjunction with the strength of the lens 22, controls the near focus point of the focusing mechanism 12. The near focus point may be calibrated as low as 18 inches. Preferably, the near focus point is about 10 feet.

The maximum deflection of the diaphragms 16, 18 in the second direction is controlled by a focus stop screw 111 on the focusing arm 88. The focus stop screw 111 is positioned substantially adjacent to the first end 90 of the focusing arm 88. The focus stop screw 111 may be adjusted to vary the maximum deflection of the diaphragms 16, 18 in the second direction which in combination with the strength of the lens 22 determines the far focus point of the focusing mechanism 12. The far focus point may be set to near infinity. Preferably, the far focus point is approximately 300 feet. The focus stop screw 111 engages the mounting assembly 19 at the maximum deflection point in the second direction after the leadscrew nut 86 travels a predetermined distance defined from the nominal position of the diaphragms 16, 18 to the position of the focus stop screw 111. Once the focus stop screw 111 engages the mounting assembly 19, the focusing arm 88 is prevented from further movement in the second direction. However, the leadscrew 84 may still drive the leadscrew nut 86 in the second direction until the leadscrew nut 86 contacts a second curved spring washer 110b. The second curved spring washer 110b is positioned around the leadscrew 84 substantially adjacent the lower portion 85b of the leadscrew housing 85. The motor 104 or the cable 106 rotates the leadscrew until the leadscrew nut 86 engages the curved spring washer 110b. Once the leadscrew nut 86 engages the curved spring washer 110b, the motor 104 is shut-off or sufficient resistance is provided to prevent further rotation of the leadscrew 84 by the cable 106.

The focusing mechanism 12 is preferably used to focus a laser beam in the laser light transmitter 10, see FIGS. 1 and 2. The laser transmitter 10 includes a housing 112, a light source 114, an optical assembly 116 and an optical projecting device 118. The light source 114 is coupled to an assembly 119. According to the illustrated embodiment, the light source 114 is preferably a laser diode which generates a beam of laser light. The assembly 119 includes a collection lens 120 that is positioned above the light source 114. The collection lens 120 serves to collect the laser beam and project it in the first direction. Preferably, the collection lens 120 is a planar convex lens which collimates the laser beam.

The optical assembly 116 includes a flat window 122, a compensator assembly 124 and the focusing mechanism 12. The compensator assembly 124 includes an optics frame 125, a compensator cup 130 and a wire clamp ring 127. The optics frame 125 is coupled to and supported by the housing 112. The assembly 119 is coupled to the optics frame 125. The flat window 122 is positioned above the collection lens 120. The flat window 122 is pivotally coupled to the optics frame 125 through a spherical pivot 129. The flat window 122 tilts along an X-axis and a Y-axis using two calibration screws (not shown). The position of the flat window 122 is finely adjusted by the calibration screws so that the laser beam is projected along a substantially vertical axis or first axis 126. The laser beam will therefore be plumb when the optics frame 125 is positioned along a plane which is substantially parallel to the plane of the ground, i.e. substantially level. A plumb beam of light is light which is projected substantially vertical with respect to the ground. The laser beam is projected in the first direction by the light source 114 and the collection lens 120 and made plumb along the first axis 126 through the flat window 122. It should be apparent that the laser beam will be plumb as long as the optics frame 125 is substantially level with respect to the ground.

The compensator assembly 124 optically adjusts the position of the laser beam so that it is plumb even when the optics frame 125 is not substantially level. The compensator assembly 124 includes a compensating lens 128 mounted in the center of the compensator cup 130. The compensator cup 130 is positioned above the flat window 122 and swings freely on three wires (not shown) which are attached to the wire clamp ring 127. The wire clamp ring 127 is coupled to the optics frame 125 through three posts (only one post 125a shown). The compensator cup 130 is free to move when the optics frame 125 is level within 12 minutes. As long as the compensator cup 130 is within 12 minutes of level, the compensating lens 128 may translate along the X and Y axes and optically adjust the laser beam so that it is plumb as it emerges from the compensator cup 130. The housing 112 is provided within an automatic or manual leveling device (not shown) to place the compensator assembly 124 within 12 minutes of level. The compensator cup 130 is suspended from the wire clamp ring 127 which is coupled to the optics frame 125 of the compensator assembly 124, so that once the compensator assembly 124 is within 12 minutes of level, the compensator cup 130 is also within 12 minutes of level. The compensator lens 128 may then optically adjust the position of the laser beam so that it is plumb as it emerges from the compensator cup 130. The compensator assembly 124 therefore compensates optically for misalignments of the optics frame 125 which are within 12 minutes of level. It should be apparent that the flat window 122 and the compensator assembly 124 function to project the laser beam along the first axis 126, either singularly or in tandem. It will be appreciated by those skilled in the art that a single collecting lens may be used for collecting and projecting the laser light along the first axis. It will be further appreciated by those skilled in the art that the light source may be designed to project the laser light along the first axis without the need for any additional lenses. It should be apparent that the present invention is not limited to the laser transmitter 10 having the illustrated optical assembly 116.

The focusing mechanism 12 is positioned above the compensating assembly 124 to adjust the focus of the laser beam as described above. The focusing mechanism 12 is coupled to the optics frame 125 through three small posts (only one small post 125b shown) by three fasteners (only one fastener 131 shown). The three posts 125a of the optics frame 125 pass through the focusing mechanism 12 so that the focusing mechanism 12 does not contact the compensator cup 130. The focusing mechanism 12 is positioned so that the first axis 126 coincides with the optical axis 28 of the lens 22 and a plumb beam of light is focused by the focusing mechanism 12 along the optical axis 28.

The wire clamp ring 127 is positioned above the focusing mechanism 12. The wire clamp ring 127 is the upper most portion to the compensator assembly 124. The wire clamp ring 127 includes the three wires (not shown) for suspending the compensator cup 130. All of the optical components are coupled to either the optics frame 125 or the wire clamp ring 127. Consequently, the compensator assembly 124 is the main frame of reference for the laser transmitter 10.

The optical projecting device 118 is coupled to the wire clamp ring 127 through a mounting ring 129. The optical projecting device 118 includes a motor (not shown) and a pentaprism 134 within a spindle 136. The optical projecting device 118 is positioned above the focusing mechanism 12 to deflect the laser beam ninety degrees with respect to vertical. The pentaprism 134 is a structure which deflects incoming light at a ninety degree angle with respect to the direction of the incoming light, within limits, regardless of the precise orientation of the pentaprism 134. Consequently, the incoming light does not have to enter the pentaprism 134 at an exact location in order to be deflected ninety degrees. The pentaprism 134 is rotated within the spindle 136 by the motor to define a substantially horizontal plane of light. As will be appreciated by those skilled in the art, the pentaprism 134 may have any reasonable angular velocity. It will be further appreciated by those skilled in the art that other light deflecting devices, such as a pentamirror, mirror, prism, reflector or refractor, may be used without departing from the scope of the present invention. While the laser transmitter 10 has been described with the laser light being transmitted upwards, it will be appreciated by those skilled in the art that optical components may be shifted appropriately so that the laser light is transmitted downwards, with the optical projecting device 118 being the lower most component and the light source 114 and assembly 119 being the upper most components.

The laser transmitter 10 provides a generally horizontal plane of light as the rotating pentaprism 134 deflects the laser beam generated by the light source 114 and projected by the optical assembly 116. The beam of light projected by the optical assembly 116 may be focused by the focusing mechanism 12 so that it may be detected by the naked eye or other optical detectors accurately, regardless of the distance between the laser transmitter 10 and the desired work area. The focus distance for the beam of light may be set manually. Additionally, the focus distance for the beam of light may be set automatically as disclosed in copending application, U.S. patent application Ser. No. 08/834,473, filed Apr. 11, 1997, by Green et al., herein incorporated by reference.

Having described the invention in detail and by reference to preferred embodiments thereof, it will be apparent that modifications and variations are possible without departing from the scope of the invention which is defined in the appended claims.

What is claimed is:

1. A focusing mechanism, comprising:
   a lens element having an outer diameter, an optical axis and a transverse plane;
   a first diaphragm having a first opening and a second diaphragm having a second opening, said lens element being mounted in said first and second openings of said first and second diaphragms, said first and second diaphragms being flexible in a direction parallel to said optical axis of said lens element and rigid in a direction parallel to said transverse plane of said lens element;
   a mounting assembly coupled to said first and second diaphragms; and
   a diaphragm flexing assembly coupled to said mounting assembly for flexing said first and second diaphragms so as to position said lens element in said direction parallel to said optical axis.

2. The focusing mechanism of claim 1, further comprising a plurality of said first diaphragms.

3. The focusing mechanism of claim 1, wherein said first diaphragm is substantially disc shaped.

4. The focusing mechanism of claim 3, wherein said first diaphragm has a center point through which said optical axis of said lens element passes.

5. The focusing mechanism of claim 4, wherein said first diaphragm is substantially flat with a solid cross-section.

6. The focusing mechanism of claim 4, wherein said first diaphragm has a first corrugated cross-section.

7. The focusing mechanism of claim 6, wherein said second diaphragm has a second corrugated cross-section.

8. The focusing mechanism of claim 7, wherein said first corrugated cross-section corresponds to said second corrugated cross-section.

9. The focusing mechanism of claim 1, wherein said lens element includes a lens and a lens housing having a third opening, a first clamp and a second clamp, said lens being mounted in said third opening of said lens housing by said first clamp, and wherein said first and second diaphragms have a first clamping section substantially adjacent said first and second openings of said first and second diaphragms, respectively, said first clamping section of said first and second diaphragms being coupled to said lens housing by said second clamp.

10. The focusing mechanism of claim 9, wherein said mounting assembly includes a mounting member having a fourth opening and a third clamp, and wherein said first and second diaphragms have an outer edge and a second clamping section substantially adjacent to said outer edge, said second clamping sections of said first and second diaphragms being mounted in said fourth opening of said mounting member by said third clamp.

11. The focusing mechanism of claim 10, wherein said diaphragm flexing assembly includes:

a focusing arm having a first end, a second end, and a hook;

a leadscrew having external threads; and a leadscrew nut having a body coupled to said first end of said focusing arm and internal threads corresponding to and engaging said external threads of said leadscrew, said leadscrew nut moves in a first direction parallel to said optical axis and said focusing arm pivots angularly about said second end of said focusing arm as said leadscrew is rotated in a first circular direction, and said leadscrew nut moves in a second direction parallel to said optical axis and opposite said first direction and said focusing arm pivots angularly about said second end of said focusing arm as said leadscrew is rotated in a second circular direction opposite said first circular direction; and wherein said lens housing includes a pin coupled to said hook of said focusing arm, so that as said focusing arm pivots angularly about said second end of said focusing arm as said leadscrew moves in said first or second directions, said hook engages said pin causing said first and second diaphragms to flex in said first or second directions causing said lens to correspondingly move in said first or second directions parallel to optical axis.

12. The focusing mechanism of claim 11, wherein said mounting member includes a flexible pivot strip coupled to said second end of said focusing arm.

13. The focusing mechanism of claim 12 wherein said diaphragm flexing device includes a motor having a shaft coupled to said leadscrew, said motor rotates said shaft in said first or second circular directions, thereby rotating said leadscrew.

14. The focusing mechanism of claim 12, wherein said diaphragm flexing device includes a cable coupled to said leadscrew, said leadscrew being rotated in said first or second circular directions by turning said cable in said first or second circular directions.

15. The focusing mechanism of claim 12, wherein diaphragm flexing assembly includes a focus stop screw substantially adjacent said first end of said focusing arm, such that said arm engages said focus stop screw after said leadscrew nut travels a predetermined distance in said second direction parallel to said optical axis.

16. The focusing mechanism of claim 12, wherein said diaphragm flexing assembly includes at least one spring coupled to said focusing arm and said mounting assembly so that the focusing arm is positioned on said leadscrew nut as said leadscrew nut travels in said first and second directions.

17. A laser transmitting device for transmitting laser light along a plane, said device comprising:

a housing;

a light source coupled to said housing and generating said laser light;

a focusing mechanism coupled to said housing and positioned to focus said laser light; and an optical projecting device coupled to said housing and positioned to receive said laser light from said focusing mechanism, said optical projecting device including a rotating reflector to project said laser light along said plane;

wherein said focusing mechanism includes:

a lens element having an outer diameter, a transverse plane, and an optical axis;

a first diaphragm having a first opening in which said lens element is mounted, said first diaphragm being flexible in a direction parallel to said optical axis of said lens element and rigid in a direction parallel to said transverse plane of said lens element;

a mounting assembly coupled to said first diaphragm; and a diaphragm flexing assembly coupled to said mounting assembly for flexing said first diaphragm so as to position said lens element in said direction parallel to said optical axis.

18. The laser transmitting device of claim 17, wherein said focusing mechanism further comprises a plurality of said first diaphragms.

19. The laser transmitting device of claim 18, wherein said first diaphragm is substantially disc shaped.

20. The laser transmitting device of claim 19, wherein said first diaphragm has a center point through which said optical axis of said lens element passes.

21. The laser transmitting device of claim 20, wherein said first diaphragm is substantially flat with a solid cross-section.

22. The laser transmitting device of claim 20, wherein said first diaphragm has a first corrugated cross-section.

23. The laser transmitting device of claim 22, wherein said focusing mechanism further comprises a second diaphragm having a second opening and a second corrugated cross-section, said lens element being mounted in said openings of said first and second diaphragms, and said second diaphragm being flexible in said direction parallel to said optical axis of said lens element and rigid in said direction parallel to said transverse plane.

24. The laser transmitting device of claim 23, wherein said first corrugated cross-section corresponds to said second corrugated cross-section.

25. The laser transmitting device of claim 17, wherein said lens element includes a lens and a lens housing having a third opening, a first clamp and a second clamp, said lens being mounted in said third opening of said lens housing by said first clamp, and wherein said first diaphragm has a first clamping section substantially adjacent said first opening of said first diaphragm, said first clamping section of said first diaphragm being coupled to said lens housing by said second clamp.

26. The laser transmitting device of claim 25, wherein said mounting assembly includes a mounting member having a fourth opening and a third clamp, and wherein said first diaphragm has an outer edge and a second clamping section substantially adjacent to said outer edge, said second clamping section of said first diaphragm being mounted in said fourth opening of said mounting member by said third clamp.

27. The laser transmitting device of claim 26, wherein said diaphragm flexing assembly includes:

a focusing arm having a first end, a second end, and a hook;

a leadscrew having external threads; and a leadscrew nut having a body coupled to said first end of said focusing arm and internal threads corresponding to and engaging said external threads of said leadscrew, said leadscrew nut moves in a first direction parallel to said optical axis and said focusing arm pivots angularly about said second end of said focusing arm as said leadscrew is rotated in a first circular direction, and said leadscrew nut moves in a second direction parallel to said optical axis and opposite said first direction and said focusing arm pivots angularly about said second end of said focusing arm as said leadscrew is rotated in a second circular direction opposite said first circular direction; and wherein said lens housing includes a pin coupled to said hook of said focusing arm, so that as said focusing arm pivots angularly about said second end of said focusing arm as said leadscrew moves in said first or second directions, said hook engages said pin causing said first diaphragm to flex in said first or second directions causing said lens to correspondingly move in said first or second directions parallel to optical axis.

28. The laser transmitting device of claim 27, wherein said mounting member includes a flexible pivot strip coupled to said second end of said focusing arm.

29. The laser transmitting device mechanism of claim 28, wherein said diaphragm flexing device includes a motor having a shaft coupled to said leadscrew, said motor rotates said shaft in said first or second circular directions, thereby rotating said leadscrew.

30. The laser transmitting device of claim 28, wherein said diaphragm flexing device includes a cable coupled to said leadscrew, said leadscrew being rotated in said first or second circular directions by turning said cable in said first or second circular directions.

31. The laser transmitting device of claim 28, wherein said diaphragm flexing assembly includes a focus stop screw substantially adjacent said first end of said focusing arm, such that said arm engages said focus stop screw after said leadscrew nut travels a predetermined distance said second direction parallel to said optical axis.

32. The laser transmitting device of claim 28, wherein said diaphragm flexing assembly includes at least one spring coupled to said focusing arm and said mounting assembly so that the focusing arm is positioned on said leadscrew nut as said leadscrew nut travels in said first and second directions.

33. A focusing mechanism, comprising:

a lens element having an outer diameter, an optical axis and a transverse plane;

a first diaphragm having a first corrugated cross-section and a first opening in which said lens element is mounted, said first diaphragm being flexible in a direction parallel to said optical axis of said lens element and rigid in a direction parallel to said transverse plane of said lens element;

a mounting assembly coupled to said first diaphragm; and a diaphragm flexing assembly coupled to said mounting assembly for flexing said first diaphragm so as to position said lens element in said direction parallel to said optical axis.

* * * * *